(12) United States Patent
Gallagher et al.

(10) Patent No.: US 9,126,630 B1
(45) Date of Patent: Sep. 8, 2015

(54) CORNER NODE AND ASSEMBLY FOR PICKUP TRUCK BOX

(71) Applicant: Ford Global Technologies, LLC, Dearborn, MI (US)

(72) Inventors: Stephen William Gallagher, Bloomfield Hills, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/317,402

(22) Filed: Jun. 27, 2014

(51) Int. Cl.
| | |
|---|---|
| *B60J 5/00* | (2006.01) |
| *B62D 27/02* | (2006.01) |
| *B62D 33/02* | (2006.01) |
| *B62D 29/00* | (2006.01) |

(52) U.S. Cl.
CPC ............ *B62D 27/023* (2013.01); *B62D 29/008* (2013.01); *B62D 33/02* (2013.01)

(58) Field of Classification Search
CPC .... B62D 25/04; B62D 21/152; B62D 25/025; B60R 21/232; B60R 2021/23316; C08F 110/06; C08F 2500/15; C08F 2500/17; C08F 10/00; B29C 65/02
USPC ................... 296/186.1, 182.1, 183.1, 193.06, 296/203.01, 29
See application file for complete search history.

(56) References Cited

U.S. PATENT DOCUMENTS

| | | | |
|---|---|---|---|
| 4,986,597 A | 1/1991 | Clausen | |
| 5,540,473 A | 7/1996 | Bills, Sr. | |
| 5,725,137 A * | 3/1998 | Macdonald | 224/405 |
| 5,947,519 A | 9/1999 | Aloe et al. | |
| 5,950,890 A * | 9/1999 | Darby | 224/402 |
| 6,435,584 B1 | 8/2002 | Bonnville | |
| 6,561,573 B2 | 5/2003 | Carcioffi | |
| 7,465,144 B1 * | 12/2008 | Studer | 414/542 |
| 7,588,285 B2 | 9/2009 | Mohammed | |
| 7,722,111 B2 | 5/2010 | Reich et al. | |
| 7,810,876 B2 | 10/2010 | Hedderly | |
| 2005/0225120 A1 * | 10/2005 | Womack et al. | 296/205 |
| 2007/0046056 A1 * | 3/2007 | Delaney et al. | 296/37.6 |
| 2007/0085381 A1 * | 4/2007 | Delaney et al. | 296/193.08 |
| 2011/0001333 A1 * | 1/2011 | Bruestle et al. | 296/100.05 |
| 2011/0084510 A1 * | 4/2011 | Marean | 296/36 |
| 2011/0298245 A1 * | 12/2011 | Jarocki et al. | 296/193.07 |

* cited by examiner

*Primary Examiner* — Kiran B Patel
(74) *Attorney, Agent, or Firm* — Raymond L. Coppiellie; Brooks Kushman P.C.

(57) ABSTRACT

A corner node for reinforcing a portion of a truck box of a pickup truck is provided. The corner node may be disposed within a cavity defined by a cross member and a corner box pillar of the truck box. The corner node may include a lateral portion and a pillar portion extending vertically from the lateral portion. The lateral portion may be secured within the cross member. The pillar portion may have a plurality of sidewalls secured to the pillar and may define a plurality of web supports spaced apart along a height of the pillar portion to reinforce a corner region of the truck box. The corner node may be five or six thousand series aluminum.

20 Claims, 5 Drawing Sheets

CORNER NODE AND ASSEMBLY FOR PICKUP TRUCK BOX

TECHNICAL FIELD

The present disclosure relates to assemblies for reinforcing aluminum pickup truck boxes and components thereof.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo and towing various types of trailers.

Stamped pickup truck box body panels may often be made from steel sheet metal which may be formed in a draw operation. Characteristics and properties of the steel sheet metal provide multiple options for forming vehicle components. Aluminum sheet metal does not share the same or similar formability characteristics and properties as steel sheet metal. While weight advantages may be obtained by using aluminum sheet metal instead of steel sheet metal, certain constraints relating to the formability of aluminum may require additional structural reinforcement. For example, corners of a pickup truck box are difficult to integrally form and also receive tailgate and user generated loads which require reinforcement to meet performance requirements. The corners also include an A-surface which has certain fit and finish requirements which may not be compromised by certain reinforcement options which result in deformation or other aesthetically displeasing marks.

This disclosure is directed to solving the above problems and other problems as summarized below.

SUMMARY

According to an aspect of the present disclosure, a corner node disposed within a cavity defined by a cross member and a corner box pillar of a pickup truck box includes a lateral portion and a pillar portion extending vertically from the lateral portion. The lateral portion is secured within the cross member. The pillar portion has a plurality of sidewalls secured to the pillar and defines a plurality of web supports spaced apart along a height of the pillar portion to reinforce a corner region of the truck box. The lateral portion may also include a base lower edge, and angled lower edge, and a base upper edge. The base lower edge may extend transversely inboard and may be substantially perpendicular to the pillar portion. The angled lower edge may extend from the base lower edge at an angle substantially equal to an angled portion of the cross member. The base upper edge may extend transversely inboard from the angled lower edge and may be substantially parallel with the base lower edge. The pillar portion may further include a vertical pillar edge and an upper horizontal pillar edge. The vertical pillar edge may extend vertically and substantially perpendicular to the lateral portion. The vertical pillar edge may be shaped to substantially match a vertical box pillar edge. The upper horizontal pillar edge may extend transversely inboard and adjacent to an opening defined by the pillar portion for tail lamp wires to pass through. The web supports may be spaced apart at intervals of seventy five to one hundred millimeters. The longitudinal portion may extend in a substantially ninety degree angle from the lateral portion and the pillar portion. The longitudinal portion may be at least partially disposed beneath and secured to a portion of an inner body side panel adjacent to the cross member. The corner node may be five or six thousand series aluminum.

According to another aspect of the present disclosure, a structural reinforcement assembly for a corner pillar region of an aluminum pickup truck box includes a truck bed, a cross member, a box pillar, and a corner node. The truck bed includes a first corner portion. The cross member is secured to the truck bed and extends laterally beneath the truck bed. The cross member has a first end adjacent to the first corner portion and defines a cross member cavity at the first end. The box pillar is disposed at the first corner portion, extends vertically above the truck bed, and is adjacent to the cross member cavity. The corner node includes a lateral portion at least partially disposed within the cross member cavity and a pillar portion secured to the box pillar. The pillar portion includes a plurality of internal web supports vertically spaced apart along the box pillar. The corner node is secured to and reinforces the corner pillar region between the cross member and the box pillar. The cross member may be a rear cross member supporting a rear end of the truck bed. The box pillar may be a rear box pillar defining a rear box pillar cavity. The pillar portion may be disposed within the rear box pillar cavity. The corner node may also include a longitudinal portion extending in a substantially ninety degree angle from the lateral portion and the pillar portion. The longitudinal portion may at least be partially disposed beneath and supporting a rear portion of an inner body side panel adjacent to the rear cross member. The cross member may be a forward cross member supporting a forward end of the truck bed. The box pillar may be a forward box pillar. The corner node may also include a longitudinal portion extending in a substantially ninety degree angle from the lateral portion and the pillar portions of the corner node. The longitudinal portion may be at least partially beneath and supporting a forward portion of an inner body side panel adjacent to a header secured to the forward end of the truck bed and supported by the forward cross member. A stake pocket reinforcement may be secured to an upper region of the pillar portion. Two of the web supports of the pillar portion may be located adjacent to a tailgate striker opening. The box pillar may be a rear box pillar and at least one of the web supports may define a plane above a tail lamp wire opening defined by the rear box pillar. The corner node may be five or six thousand series aluminum.

According to a further aspect of the present disclosure, a pickup truck box assembly includes a truck bed, a set of forward box pillars, a forward cross member, a header, and a set of forward corner nodes. The truck bed has forward and rear ends. The set of forward box pillars is secured at respective corners of the forward end of the truck bed. The forward cross member extends laterally beneath the truck bed between the forward box pillars and defines a forward cross member cavity at least partially open at either end adjacent to the respective forward box pillars. The header is mounted to the truck bed at the forward end and between the forward box pillars. The set of forward corner nodes each include a forward lateral portion at least partially disposed within the respective forward cross member cavity and a forward pillar portion secured to at least the respective forward box pillar. The forward pillar portion extends vertically from the forward lateral portion, has one or more sidewalls, and a plurality of web supports secured between the sidewalls and vertically spaced apart along the forward pillar portion to reinforce the forward box pillars and the forward cross member. The forward corner nodes may each include a forward longitudinal portion extending in a substantially ninety degree angle from the forward lateral portions and the forward pillar portions. The forward longitudinal portion may be at least partially disposed beneath and secured to a portion of an inner body side panel adjacent to the forward cross member. A set of rear box pillars may be secured at respective corners of the rear end of the truck bed and each define a rear box pillar cavity. A rear cross member may extend laterally beneath the truck bed between the rear box pillars and define a rear cross member cavity at least partially open at either end to the respective rear box pillar cavity. A tailgate may be mounted for rotation to the bed at the rear end and between the rear box pillars. A set of rear corner nodes may each include a rear lateral portion at least partially disposed within the respective rear cross member cavity and rear box pillar cavity, and a rear pillar portion disposed with the rear box pillar cavity and extending vertically from the rear lateral portion. The rear pillar portion may have a plurality of sidewalls and a plurality of web supports secured between the sidewalls and vertically spaced apart along the rear pillar portion to reinforce the rear box pillars and the rear cross member. The rear corner nodes may each include a rear longitudinal portion extending in a substantially ninety degree angle from the rear lateral portions and the rear pillar portions The rear longitudinal portion may be at least partially disposed beneath and secured to a portion of an inner body side panel adjacent to the rear cross member. The forward corner nodes and the rear corner nodes may be five or six thousand series aluminum. The lateral portions may also include a base lower edge, an angled lower edge, and a base upper edge. The base lower edge may extend transversely inboard and substantially perpendicular to the respective pillar portion. The angled lower edge may extend from the base lower edge at an angle substantially equal to an angled portion of the respective cross member. The base upper edge may extend transversely inboard from the angled lower edge and substantially parallel with the base lower edge. At least one of the web supports of the rear pillar portions may be located adjacent to a tailgate striker opening.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
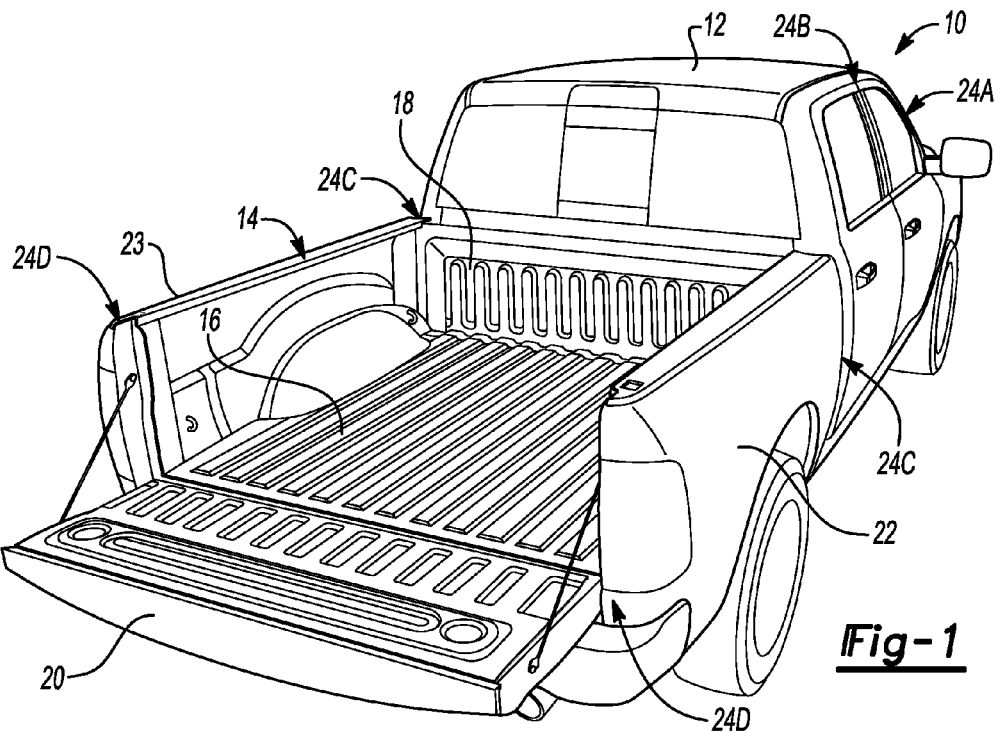
FIG. 1 is a rear perspective view of a vehicle.
Figure 2:
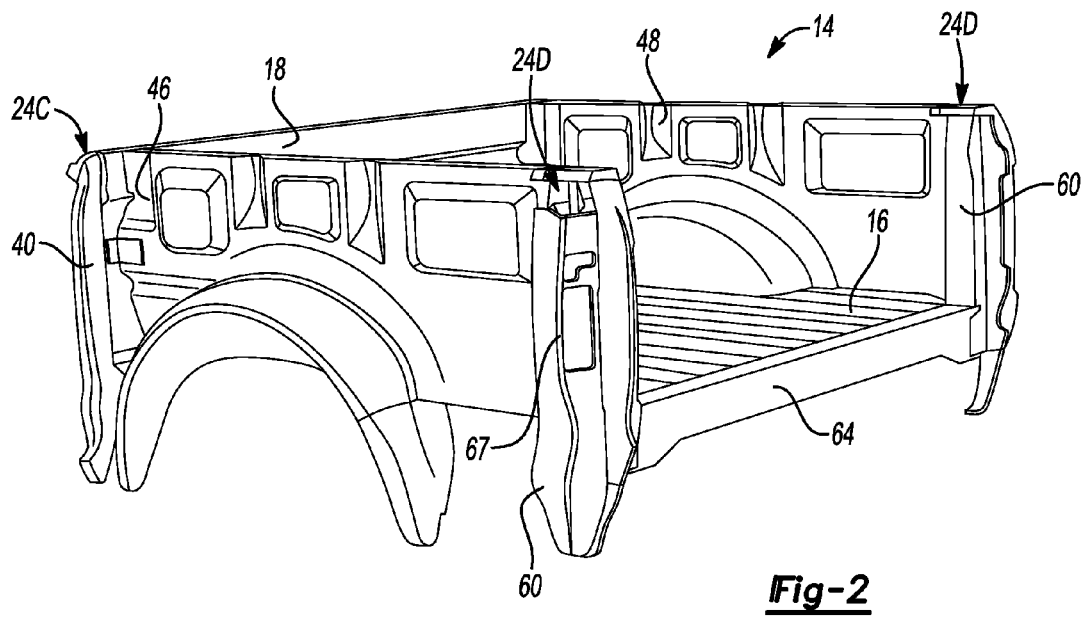
FIG. 2 is a perspective view of an example of a pickup truck box of the vehicle of FIG. 1 shown with outer body panels removed.
Figure 3:
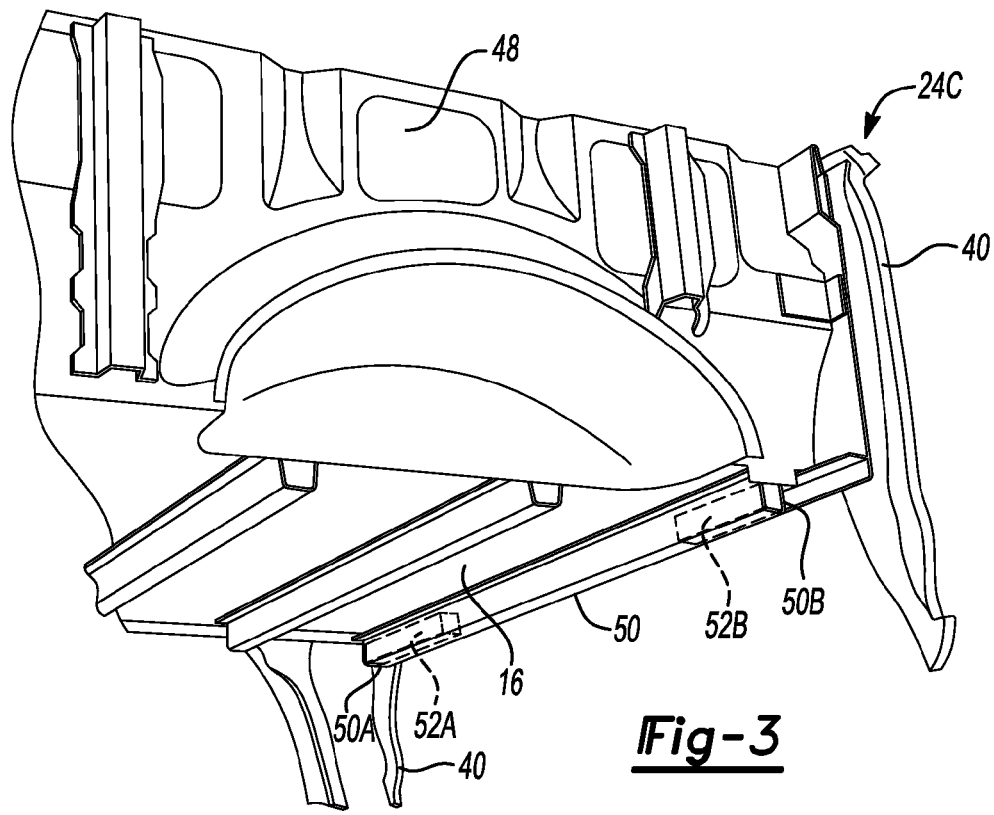
FIG. 3 is a fragmentary perspective view of the pickup truck box of FIG. 2 showing a forward box pillar, a lower bed portion, and an inner body side panel.
Figure 4:
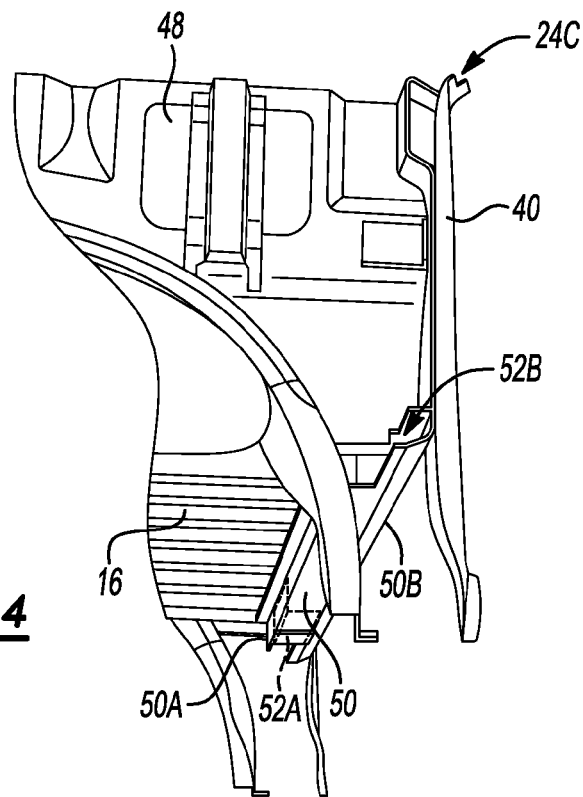
FIG. 4 is a fragmentary perspective view of the pickup truck box of FIG. 2 showing a detailed view of one of a region at one of the forward box pillars.
Figure 5:
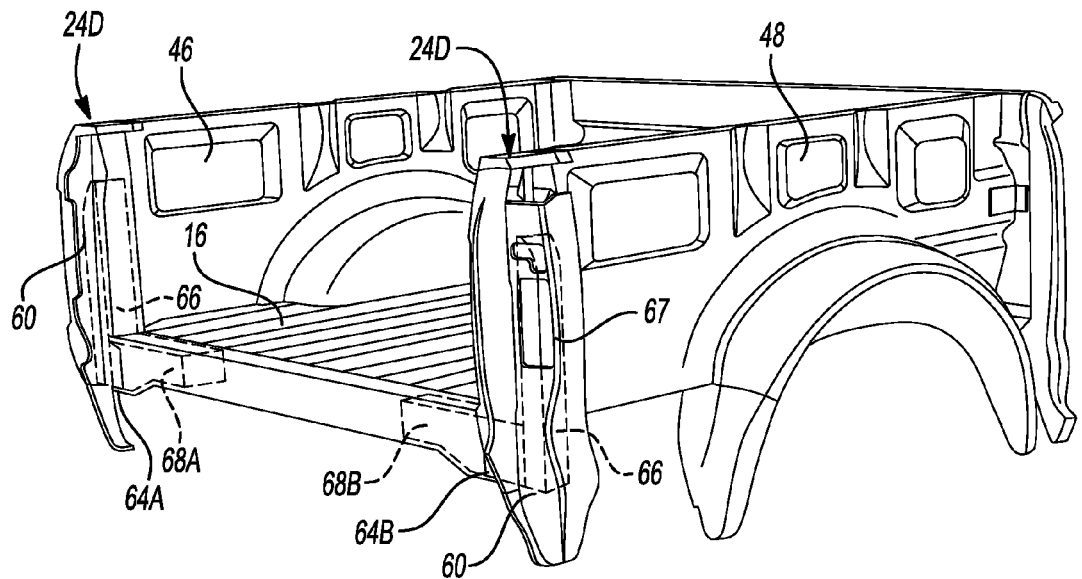
FIG. 5 is a fragmentary perspective view of the pickup truck box of FIG. 2 showing rear box pillars, a bed portion, and inner body side panels.
Figure 6:
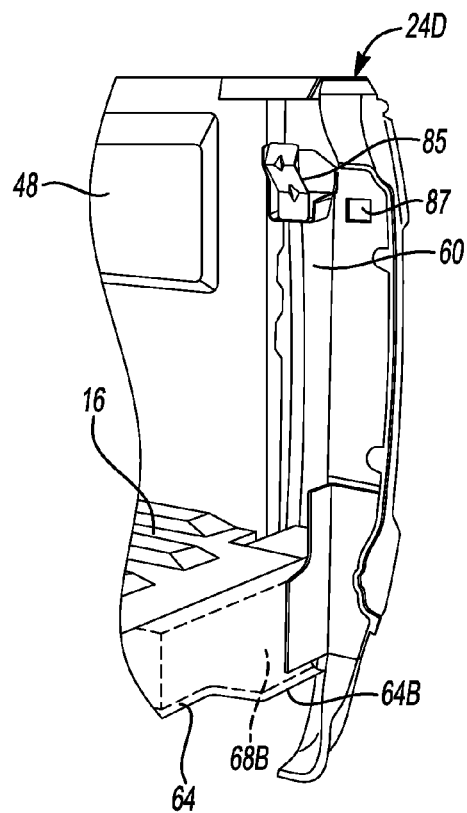
FIG. 6 is a fragmentary perspective view of the pickup truck box of FIG. 2 showing a detailed view of one of the rear box pillars with an inner portion removed.

Referring to FIG. 1, an example of a vehicle 10 is illustrated that includes a cabin 12 and a truck box 14 supported by a vehicle chassis (not shown). The vehicle 10 may be, for example, a pickup truck comprising a majority of aluminum components. The truck box 14 includes a bed 16 having a forward end adjacent to the cabin 12 and a rear end opposite the forward end. The bed 16 supports a header 18 at the forward end and a tailgate 20 at the rear end. The tailgate 20 is mounted to the bed 16 for rotation. The bed 16 may also support a first body side panel 22 and a second body side panel 23. In this example, the vehicle 10 may include an A-pillar region 24a, a B-pillar region 24b, a C-pillar region 24c, and a D-pillar region 24d. The illustrated vehicle 10 is a four door configuration, however other configurations, such as a two door configuration may be adopted to incorporate the disclosed concepts. Alternate configurations may include different pillar region references than vehicle 10. The first body side panel 22 and second body side panel 23 may be secured to the header 18 at respective regions referred to as forward box pillar regions of the truck box 14 or the C-pillar regions 24c herein. The tailgate 20 rotates from at least an open position to a closed position. In the closed position as shown in FIG. 1, each lateral end of the tailgate 20 may be removably attached to the first body side panel 22 and the second body side panel 23 at respective regions referred to as rear box pillar regions or the D-pillar regions 24d herein. Components of the vehicle 10, such as the tailgate 20 and the side panels 22 and 23, may be made of five thousand series or six thousand series aluminum alloy.

Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminum alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F- as fabricated, O-annealed, H-strain hardened, T-thermally treated, and W- as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

FIGS. 2 through 6 show one example of a configuration for the truck box 14. The truck box 14 includes joints between components at the C-pillar regions 24c and the D-pillar regions 24d. A set of forward box pillars 40 assist in supporting the C-pillar regions 24c and a set of rear box pillars 60 assist in supporting the D-pillar regions 24d. For example, the forward box pillars 40 may each be secured to the bed 16, the header 18, a first inner body side panel 46, and a second inner body side panel 48. The forward box pillars 40 may each be secured to a forward cross member 50 at one of a first end 50a and a second end 50b. Each of the forward box pillars 40 includes a plurality of sidewalls. The forward cross member 54 extends laterally beneath the bed 16 and provides support to the forward end of the bed 16. The forward cross member 50 defines respective forward cross member cavities 52a and 52b at the first end 50a and the second end 50b. The forward cross member cavities 52a and 52b may be adjacent to a lower portion of the forward box pillars 40 and at least partially open.

A set of rear box pillars 60 assist in supporting the D-pillar regions 24d. For example, the rear box pillars 60 may each be secured to the rear end of the bed 16, the inner body side panel 46, the inner body side panel 48, and a rear cross member 64. The rear box pillars 60 may be comprised of more than one component, such as an inner and outer component. The rear box pillars 60 may each be secured to the rear cross member 64 at one of a first end 64a and a second end 64b. Each of the rear box pillars 60 includes a plurality of sidewalls which define a rear box pillar cavity 66 therein. The rear box pillars 60 may also define an access opening 67 for cables or wires, such as tail lamp wires, to pass through. The rear cross member 64 extends laterally beneath the bed 16 and provides support to the rear end of the bed 16. The rear cross member 64 defines respective rear cross member cavities 68a and 68b at the first end 64a and the second end 64b. The rear cross member cavities 68a and 68b may be at least partially open to one of the rear box pillar cavities 66.

Figure 7A:
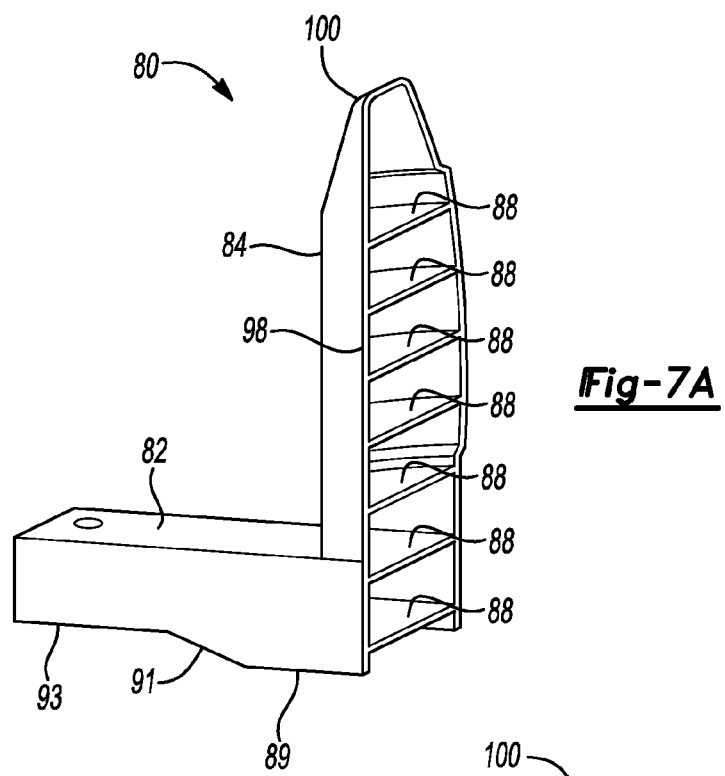
FIG. 7a is a perspective view of an example of a corner node having a pillar portion and a lateral portion.

A corner node may be utilized to provide additional support to one or more joints at the C-pillar regions 24c and the d-pillar regions 24d of the truck box 14. For example, FIG. 7a shows a corner node 80 which includes a lateral portion 82 and a pillar portion 84 extending vertically from an end of the lateral portion 82. The lateral portion 82 may have two or more sidewalls. The pillar portion 84 may have two or more sidewalls and may define a plurality of pillar portion web supports 88 secured between the sidewalls of the pillar portion 84 and spaced apart along the pillar portion 84. As a non-limiting example, the web supports 88 may be spaced apart at intervals between approximately seventy five and one hundred millimeters. It is contemplated that the pillar portion 84 may have alternative sidewall configurations in which at least a portion of the web supports 88 are exposed or accessible to facilitate die casting of the corner node 80. In one example, two of the web supports 88 may be located above, below, and adjacent a striker hole 87. An accessory, such as a stake pocket reinforcement 85, may be secured to an upper portion of the pillar portion 84. The accessory may also be formed as part of the upper portion of the pillar portion 84.

Figure 7B:
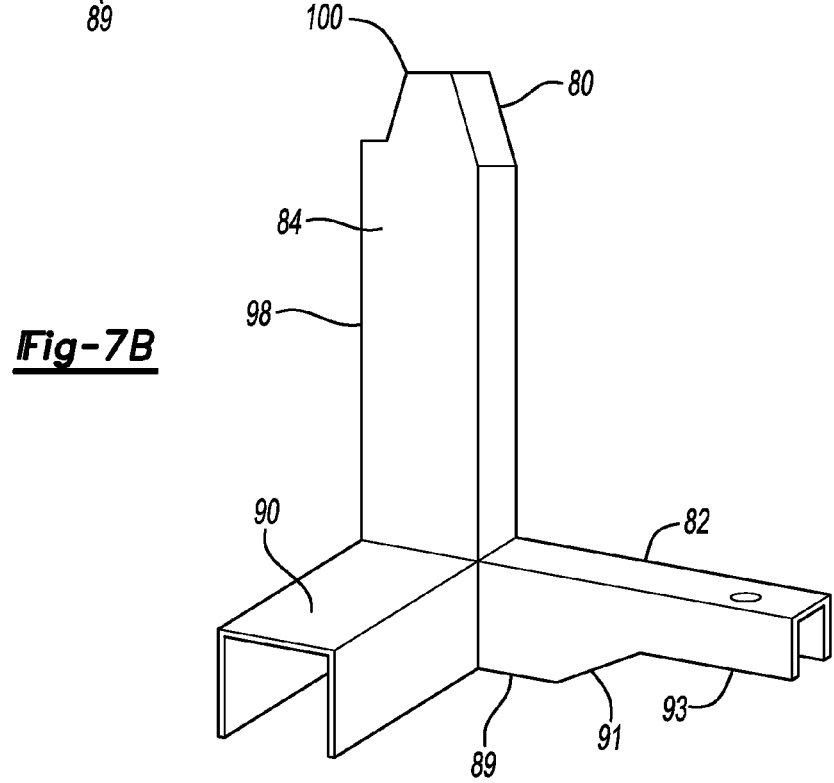
FIG. 7b is a perspective view of another example of a corner node having a pillar portion, a lateral portion, and a longitudinal portion.

The lateral portion 82 may include a base lower edge 89 extending transversely inboard and substantially perpendicular to the pillar portion 84. The lateral portion 82 may also include an angled lower edge 91 extending from the base lower edge 89 at an angle substantially equal to an angled portion 92 of the cross member 64. The angled portion 92 of the cross member 64 may provide space for components of the vehicle 10 such as components of the vehicle frame (not shown). The lateral portion 82 may also include a base upper edge 93 extending transversely inboard from the angled lower edge 91 and substantially parallel with the base lower edge 89. The pillar portion 84 may include a vertical pillar edge 98 extending vertically and substantially perpendicular to the lateral portion 82. In an example in which the corner node 80 is used to reinforce the D-pillar regions 24d, the vertical pillar edge 98 may be shaped to substantially match a vertical box pillar edge defined by the respective rear box pillar 60. The pillar portion 84 may also include an upper horizontal pillar edge 100 extending transversely inboard from the vertical pillar edge 98. The pillar edge 100 may also be located adjacent to the access opening 67 defined by the rear box pillars 60. In another example, FIG. 7b shows the corner node 80 including a longitudinal portion 90 extending in a substantially ninety degree angle from the lateral portion 82 and the pillar portion 84. In this example of the corner node 80 which includes the longitudinal portion 90, the longitudinal portion 90 may be at least partially disposed beneath and secured to a portion of the respective inner body side panel 22 or 23 and adjacent to the respective cross member 50 or 64.

Figure 8:
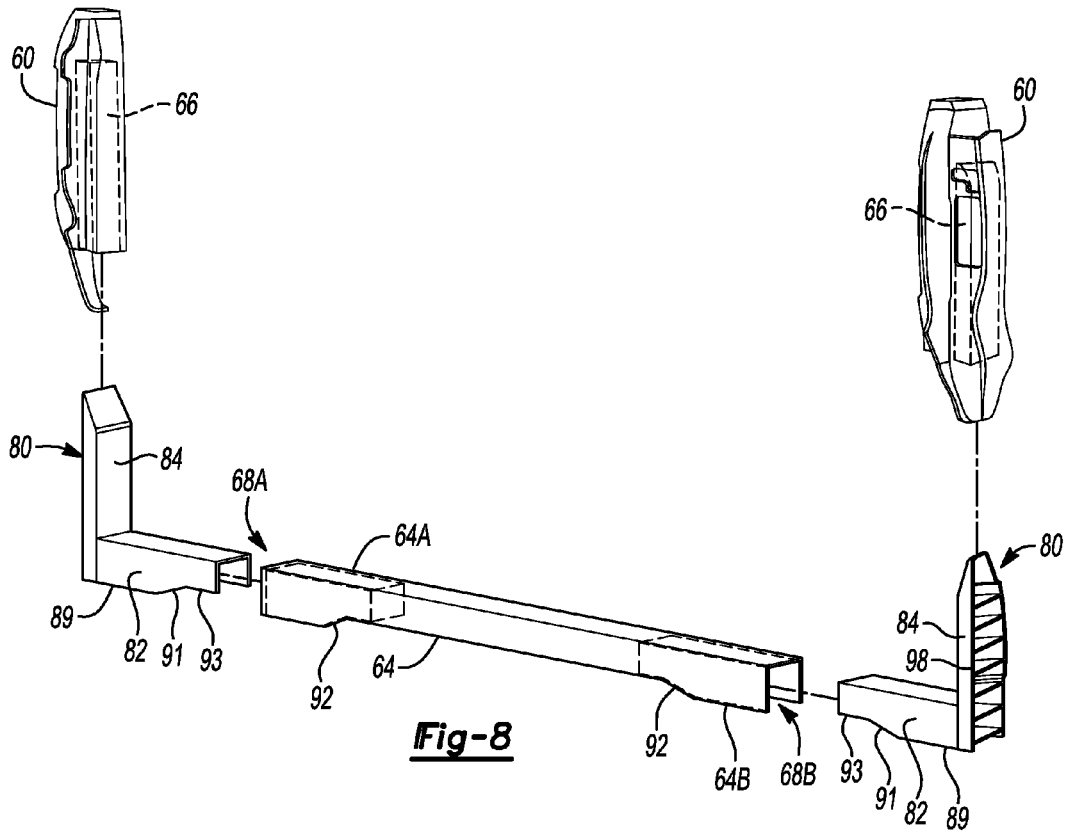
FIG. 8 is an exploded perspective view of two corner nodes shown aligned with and prior to disposition within a rear cross member and two rear box pillars.
Figure 9:
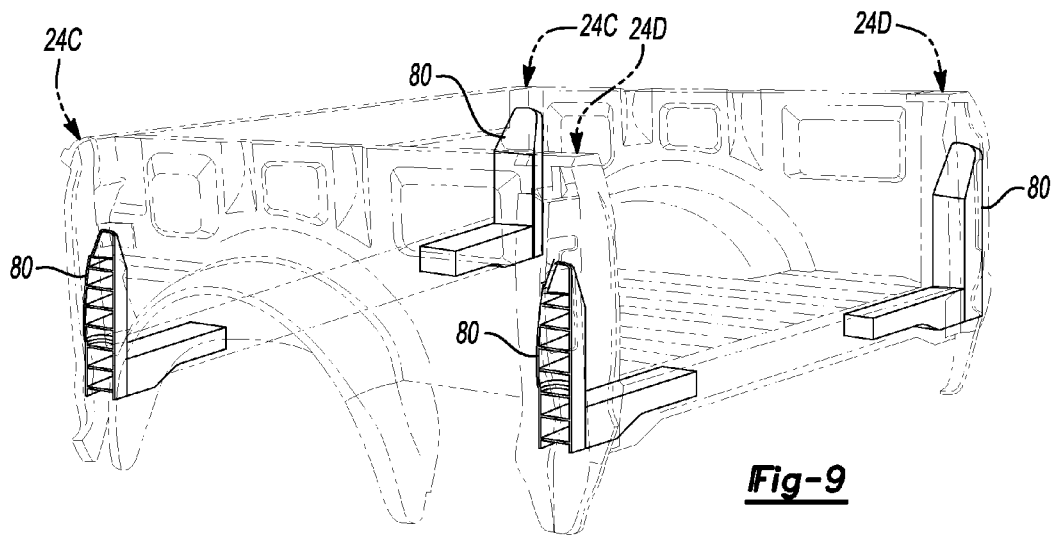
FIG. 9 is a perspective view of the pickup truck box from FIG. 2 shown in broken lines to illustrate an example of locations for four corner nodes at the forward and rear box pillars.

FIG. 8 shows two of the corner nodes 80 prior to disposition within the rear box pillar cavities 66 and their respective rear cross member cavities 68a and 68b. FIG. 9 shows four corner nodes 80 positioned at each of the C-pillar regions 24c and the D-pillar regions 24d to provide reinforcement to the joints between the components in and adjacent thereto. In one example of corner nodes 80 utilized in the D-pillar regions 24d, the pillar portion 84 may be disposed within the rear box pillar cavity 66. The sidewalls of the pillar portion 84 of the corner node 80 may correspond and be secured to inner portions of the sidewalls of the rear box pillars 60. A shape of the sidewalls of the pillar portion 84 may match a shape of the inner portions of the sidewalls of the rear box pillars 60. The lateral portion 82 of the corner node 80 may be secured to inner portions of the rear cross member 64 defining the respective rear cross member cavities 68a and 68b at the first end 64a and the second end 64b. The lateral portion 82 may also be partially disposed within a portion of the rear box pillar cavity 66. A shape of the sidewalls of the lateral portion 82 may match a shape of the inner portions of the rear cross member 64 defining the rear cross member cavities 68a and 68b.

In another example of corner nodes 80 utilized in the C-pillar regions 24c, the lateral portion 82 may be at least partially disposed within the respective forward cross member cavities 52a and 52b. The pillar portion 84 extends vertically from the lateral portion 82 and is secured to at least the respective forward box pillar 40. The pillar portion 84 may also be secured to the respective inner body side panel 46 or 48. In this example, the plurality of web supports 88 are vertically spaced apart along the respective forward box pillar 40 such that the corner nodes 80 reinforce the C-pillar regions 24c between the forward cross member 50 and the forward box pillars 40.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A structural reinforcement assembly for a corner pillar region of an aluminum pickup truck box comprising:
   a truck bed including a first corner portion;
   a cross member secured to the truck bed, extending laterally beneath the truck bed, having a first end adjacent to the first corner portion, and defining a cross member cavity at the first end;
   a box pillar disposed at the first corner portion, extending vertically above the truck bed, and adjacent to the cross member cavity; and
   a corner node including a lateral portion at least partially disposed within the cross member cavity, and a pillar portion secured to the box pillar, wherein the pillar portion includes a plurality of internal web supports vertically spaced apart along the box pillar, and wherein the corner node is secured to and reinforces the corner pillar region between the cross member and the box pillar.

2. The assembly of claim 1, wherein the cross member is a rear cross member supporting a rear end of the truck bed and the box pillar is a rear box pillar defining a rear box pillar cavity, and wherein the pillar portion is disposed within the rear box pillar cavity, and wherein the corner node further comprises a longitudinal portion extending in a substantially ninety degree angle from the lateral portion and the pillar portion, and wherein the longitudinal portion is at least partially disposed beneath and supporting a rear portion of an inner body side panel adjacent to the rear cross member.

3. The assembly of claim 1, wherein the cross member is a forward cross member supporting a forward end of the truck bed and the box pillar is a forward box pillar, and wherein the corner node further comprises a longitudinal portion extending in a substantially ninety degree angle from the lateral portion and the pillar portions of the corner node, and wherein the longitudinal portion is at least partially beneath and supporting a forward portion of an inner body side panel adjacent to a header secured to the forward end of the truck bed and supported by the forward cross member.

4. The assembly of claim 1, wherein a stake pocket reinforcement is secured to an upper region of the pillar portion.

5. The assembly of claim 1, wherein two of the web supports of the pillar portion are located adjacent to a tailgate striker opening.

6. The assembly of claim 1, wherein the box pillar is a rear box pillar, and wherein at least one of the web supports defines a plane above a tail lamp wire opening defined by the rear box pillar.

7. The assembly of claim 1, wherein the corner node is five or six thousand series aluminum.

8. An aluminum pickup truck box assembly comprising:
   a truck bed having forward and rear ends;
   a set of forward box pillars secured at respective corners of the forward end of the truck bed;
   a forward cross member extending laterally beneath the truck bed between the forward box pillars and defining a forward cross member cavity at least partially open at either end adjacent to the respective forward box pillars;
   a header mounted to the truck bed at the forward end and between the forward box pillars; and
   a set of forward corner nodes each including a forward lateral portion at least partially disposed within the respective forward cross member cavity and a forward pillar portion secured to at least the respective forward box pillar, the forward pillar portion extending vertically from the forward lateral portion, having one or more sidewalls and a plurality of web supports secured between the sidewalls and vertically spaced apart along the forward pillar portion to reinforce the forward box pillars and the forward cross member.

9. The assembly of claim 8, wherein the forward corner nodes each further include a forward longitudinal portion extending in a substantially ninety degree angle from the forward lateral portions and the forward pillar portions, and wherein the forward longitudinal portion is at least partially disposed beneath and secured to a portion of an inner body side panel adjacent to the forward cross member.

10. The assembly of claim 8, further comprising:
    a set of rear box pillars secured at respective corners of the rear end of the truck bed and each defining a rear box pillar cavity;
    a rear cross member extending laterally beneath the truck bed between the rear box pillars and defining a rear cross member cavity at least partially open at either end to the respective rear box pillar cavity;
    a tailgate mounted for rotation to the bed at the rear end and between the rear box pillars; and
    a set of rear corner nodes each including a rear lateral portion at least partially disposed within the respective rear cross member cavity and rear box pillar cavity, and a rear pillar portion disposed with the rear box pillar cavity and extending vertically from the rear lateral portion, the rear pillar portion having a plurality of sidewalls and a plurality of web supports secured between the sidewalls and vertically spaced apart along the rear pillar portion to reinforce the rear box pillars and the rear cross member.

11. The assembly of claim 10, wherein the rear corner nodes each further include a rear longitudinal portion extending in a substantially ninety degree angle from the rear lateral portions and the rear pillar portions, and wherein the rear longitudinal portion is at least partially disposed beneath and secured to a portion of an inner body side panel adjacent to the rear cross member.

12. The assembly of claim 10, wherein the forward corner nodes and the rear corner nodes are five or six thousand series aluminum.

13. The assembly of claim 10, wherein the lateral portions further comprise:
    a base lower edge extending transversely inboard and substantially perpendicular to the respective pillar portion;
    an angled lower edge extending from the base lower edge at an angle substantially equal to an angled portion of the respective cross member; and
    a base upper edge extending transversely inboard from the angled lower edge and substantially parallel with the base lower edge.

14. The assembly of claim 10, wherein at least one of the web supports of the rear pillar portions is located adjacent to a tailgate striker opening.

15. An aluminum pickup truck box assembly comprising a corner node disposed within a cavity defined by a cross member and a box pillar, the node defining a lateral portion secured within the cross member and a pillar portion extending vertically from the lateral portion, having a plurality of sidewalls secured to the pillar, and defining web supports spaced apart along a height of the pillar portion to reinforce a corner region of the truck box.

16. The aluminum pickup truck box assembly of claim 15, wherein the lateral portion further comprises:
- a base lower edge extending transversely inboard and substantially perpendicular to the pillar portion;
- an angled lower edge extending from the base lower edge at an angle substantially equal to an angled portion of the cross member; and
- a base upper edge extending transversely inboard from the angled lower edge and substantially parallel with the base lower edge.

17. The aluminum pickup truck box assembly of claim 15, wherein the pillar portion further comprises:
- a vertical pillar edge extending vertically and substantially perpendicular to the lateral portion and shaped to substantially match a vertical box pillar edge; and
- an upper horizontal pillar edge extending transversely inboard and adjacent to an opening defined by the pillar portion for tail lamp wires to pass through.

18. The aluminum pickup truck box assembly of claim 15, wherein the web supports are spaced apart at intervals of seventy five to one hundred millimeters.

19. The aluminum pickup truck box assembly of claim 15, further comprising a longitudinal portion extending in a substantially ninety degree angle from the lateral portion and the pillar portion, wherein the longitudinal portion is at least partially disposed beneath and secured to a portion of an inner body side panel adjacent to the cross member.

20. The aluminum pickup truck box assembly of claim 15, wherein the corner node is five or six thousand series aluminum.

* * * * *